(12) United States Patent
Whitmer et al.

(10) Patent No.: US 11,036,675 B1
(45) Date of Patent: Jun. 15, 2021

(54) STRONG REFERENCING BETWEEN CATALOG ENTRIES IN A NON-RELATIONAL DATABASE

(71) Applicant: EMC Corporation, Hopkinton, MA (US)

(72) Inventors: Ray David Whitmer, Pleasant Grove, UT (US); Ajit Kumar Verma, Pleasant Grove, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1167 days.

(21) Appl. No.: 15/195,574

(22) Filed: Jun. 28, 2016

(51) Int. Cl.
*G06F 16/11* (2019.01)
*G06F 9/455* (2018.01)

(52) U.S. Cl.
CPC ........ *G06F 16/125* (2019.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 5,592,661 A * | 1/1997 | Eisenberg | G06F 16/2365 |
| 6,356,916 B1 | 3/2002 | Yamatari et al. | |
| 7,680,830 B1 | 3/2010 | Ohr et al. | |
| 8,099,572 B1 | 1/2012 | Arora | |
| 8,352,431 B1 | 1/2013 | Protopopov | |
| 8,510,271 B1 | 8/2013 | Tsaur | |
| 8,566,297 B1 | 10/2013 | Dowers et al. | |
| 9,189,414 B1 | 11/2015 | Shim | |
| 9,250,891 B1 * | 2/2016 | Beranek | G06F 8/70 |
| 9,811,459 B1 | 11/2017 | Allen | |
| 2004/0167898 A1 | 8/2004 | Margolus | |
| 2005/0203969 A1 | 9/2005 | Kawabe | |
| 2007/0061385 A1 | 3/2007 | Clark | |
| 2007/0073791 A1 | 3/2007 | Bruce | |
| 2007/0233828 A1 | 10/2007 | Gilbert | |
| 2008/0162595 A1 | 7/2008 | Kushwah | |
| 2008/0228795 A1 | 9/2008 | Lomet | |
| 2009/0125572 A1 | 5/2009 | Cannon | |
| 2009/0248757 A1 | 10/2009 | Havewala | |
| 2009/0307236 A1 | 12/2009 | Kramer | |
| 2009/0327262 A1 * | 12/2009 | Grack | G06F 16/93 |
| 2011/0010700 A1 | 1/2011 | Lanner et al. | |
| 2012/0078896 A1 | 3/2012 | Nixon et al. | |

(Continued)

OTHER PUBLICATIONS

U.S. Appl. No. 15/194,871, filed Jun. 28, 2016, Whitmer, et al.

(Continued)

*Primary Examiner* — Amresh Singh
(74) *Attorney, Agent, or Firm* — Workman Nydegger (57) ABSTRACT

In one example, a method for managing data includes identifying a dependent relation between a first version and a second version of a data element, wherein the first version is dependent upon the second version, and inserting a strong reference between the first version of the data element and the second version of the data element. Next, respective expiration times are determined for each of the first version and the second version, and a determination made as to whether the first version expires prior to the second version. When the second version has an expiration time prior to an expiration time of the first version, expiration of the second version is suspended.

20 Claims, 5 Drawing Sheets

(56) References Cited

U.S. PATENT DOCUMENTS

| | | |
|---|---|---|
| 2012/0303587 A1 | 11/2012 | Kushwah |
| 2014/0025641 A1* | 1/2014 | Kumarasamy ...... G06F 16/2365 |
| | | 707/661 |
| 2014/0181027 A1 | 6/2014 | Whitehead |
| 2014/0181041 A1 | 6/2014 | Whitehead |
| 2015/0032698 A1 | 1/2015 | Cochrane |
| 2015/0039849 A1 | 2/2015 | Lewis |
| 2015/0227538 A1* | 8/2015 | Rambacher ........... G06F 16/273 |
| | | 707/624 |
| 2016/0012070 A1 | 1/2016 | Aggarwal |
| 2016/0070717 A1 | 3/2016 | Bergner |
| 2017/0124220 A1 | 5/2017 | Krueger et al. |

OTHER PUBLICATIONS

U.S. Appl. No. 15/195,197, filed Jun. 28, 2016, Whitmer, et al.
U.S. Appl. No. 15/195,362, filed Jun. 28, 2016, Whitmer, et al.
U.S. Appl. No. 15/195,469, filed Jun. 28, 2016, Whitmer, et al.
U.S. Appl. No. 15/194,871, filed Jan. 31, 2019, Final Office Action.
U.S. Appl. No. 15/195,197, filed Apr. 15, 2019, Final Office Action.
U.S. Appl. No. 15/195,469, filed Apr. 29, 2019, Final Office Action.
U.S. Appl. No. 15/194,871, filed May 8, 2019, Office Action.
U.S. Appl. No. 15/195,362, filed Jun. 14, 2019, Office Action.
U.S. Appl. No. 15/195,197, filed Jul. 30, 2019, Final Office Action.
U.S. Appl. No. 15/195,469, filed Oct. 1, 2018, Office Action.
U.S. Appl. No. 15/195,197, filed Oct. 12, 2018, Office Action.
U.S. Appl. No. 15/194,871, filed Jun. 27, 2018, Whitmer, et al.
U.S. Appl. No. 15/194,871, filed Apr. 15, 2020, Office Action.
U.S. Appl. No. 15/195,197, filed Oct. 25, 2020, Office Action.
U.S. Appl. No. 15/195,197, filed Mar. 12, 2020, Office Action.
U.S. Appl. No. 15/195,469, filed Aug. 29, 2019, Office Action.
U.S. Appl. No. 15/195,469, filed Feb. 4, 2020, Office Action.

* cited by examiner

STRONG REFERENCING BETWEEN CATALOG ENTRIES IN A NON-RELATIONAL DATABASE

RELATED APPLICATIONS

This application is related to: U.S. patent application Ser. No. 15/194,871, entitled CATALOG VIEWS, and filed the same day herewith; U.S. patent application Ser. No. 15/195,197, entitled POINT IN TIME MODEL FOR BACKUP TIMELINES, and filed the same day herewith; U.S. patent application Ser. No. 15/195,362, entitled DISTRIBUTED MODEL FOR DATA INGESTION, and filed the same day herewith; and, U.S. patent application Ser. No. 15/195,469, entitled RECLAMATION AND RECONCILIATION IN A STORAGE ENVIRONMENT, and filed the same day herewith. All of the aforementioned applications are incorporated herein in their respective entireties by this reference.

FIELD OF THE INVENTION

Embodiments of the present invention generally concern management of backed up data. More particularly, at least some embodiments of the invention relate to systems, hardware, computer-readable media, and methods directed to establishing and maintaining context-sensitive references between data element versions.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

While there is little question about the need to back up important data, the ongoing accumulation of multiple versions of one or more files or other objects, as well as other considerations, can result in the transmission and storage of a vast amount of data. Such large amounts of data can overwhelm conventional data storage and processing systems. Thus, systems and methods have been developed that mark stored versions for eventual deletion from storage. When these versions are removed, the storage space that they formerly occupied can be reclaimed. Such systems and methods may use a variety of approaches to identifying data for deletion from storage.

Some of the systems and methods that are used to clean up storage are somewhat arbitrary in their approach to deleting data from storage. In one particular implementation of such a method, a version may be deleted simply because it is the oldest version in storage. As another example, a version may be deleted merely because it has been in storage for a set period of time.

However, while approaches such as these can reduce the amount of stored data, they may be problematic in some circumstances. For example, these approaches to cleanup ignore the presence of any relationships that may exist between the deleted version and any other version, or versions, that may remain in storage. Thus, deletion of a version from storage may have an undesirable effect with regard to one or more associated versions remaining in storage. In more detail, there may be objects or other data remaining in storage that have a dependent relationship with the version targeted for deletion. When the targeted version is deleted, the relationship is destroyed, and the dependent object(s) or other data that remains in storage is broken. Following is an illustration of this point.

A virtual machine (VM), for example, may include a variety of different components, each of which is a necessary element for the VM to function properly. While all the components must be present together for a functional VM to exist, the various components may be stored separately in storage. As well, for example, the stored version of a first component may have a different expiration time than the stored version of a second component and, as a result, the constituent components of the VM can expire at a variety of different respective times. Thus, if one component of the VM expires and is removed from storage, the VM cannot be restored to a target because all the necessary components of the VM are no longer stored.

In view of problems such as these, and others, it would be useful to be able to preserve data elements in storage that have a dependent relationship with each other. It would also be useful to be able to preserve such data elements and their dependent relationship, notwithstanding that one or more of the data elements may have expired and would otherwise be removed from storage. Finally, it would be useful to be able to implement such functionality in an environment such as a non-relational database.

DESCRIPTION OF THE FIGURES

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern management of backed up data. More particularly, at least some embodiments of the invention relate to systems, hardware, computer-readable media, and methods directed to establishing and maintaining context-sensitive references between data element versions.

Embodiments of the invention can be employed, for example, in connection with backup data targeted for storage, and in connection with backup data that has already been stored. In some cases, embodiments of the invention are implemented in a cloud storage environment, although that is not required and other embodiments can be employed in any other storage environment, one example of which is an on-premises storage environment for example. Regardless of the particular nature of the storage environment, at least some embodiments are employed in connection with storage structures and elements that take the form of a non-relational database or other comparable data structure.

Embodiments of the invention can be employed in connection with any type or form of data. As used herein, the terms 'data' and 'data element' are intended to be construed broadly and embrace, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. Likewise, the term 'metadata' as used herein is intended to be broad in scope and embraces, at least, any information about any of the types of data disclosed herein. Examples of metadata include, but are not limited to, information about a data element such as the version, creation date, and expiration date.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples noted immediately below, as well as the examples disclosed elsewhere herein, it should be noted that the use of the term 'object' is employed simply as a convenient way to illustrate aspects of embodiments of the invention. However, the scope of the invention is not limited to the use of objects nor to any other particular form, group, set, combination or string, of data or data element.

In some example embodiments of the invention, directed relationships are used to ensure that as between two or more elements, which can be stored or targeted to be stored, where a first one of the elements is dependent upon a second one of the elements, the independent second element is not removed from storage before the dependent first element is removed from storage. The elements sharing the dependent relationship can be data elements, such as objects for example, or can be metadata, such as catalog entries for example.

The dependent relationship can take a variety of forms. In one example, two catalog entries may be associated with respective data elements that have a parent-child relation with each other. The directed relationship in this example can provide that the child version will not be allowed to expire before the parent version expires, notwithstanding that a computed expiration date for the child may predate the expiration date of the parent. Thus, the child version will not be removed from storage so long as the parent version remains in storage. More particularly, the child version may be removed from storage at the same time as the parent version, or subsequent to removal of the parent version from storage.

In some cases, the computed expiration date for the child can be overridden and replaced with the expiration date of the parent so that both will expire at the same time. In any case, at least some embodiments provide that a parent and its children will only be allowed to expire together as a set, and will likewise be removed from storage at the same time.

Advantageously then, dependencies between elements in storage, or that will be stored, can be maintained notwithstanding that the elements may have different expiration times. In this way, the integrity of the dependent elements can be preserved until such time as the dependent elements are removed from storage.

A. Example Operating Environment

In general, embodiments of the invention may include and/or be implemented in an operating environment that includes various clients and/or other devices that generate and/or cause the generation of data that is backed up at a cloud storage site and/or other site. In at least some embodiments of the invention, any of the methods disclosed herein can be performed in whole or in part at a cloud storage site, although that is not necessarily required. As noted earlier, at least some embodiments are particularly well suited for use in storage environments that make use of one or more non-relational databases.

As used herein, the term 'client' is intended to have broad scope and embraces, among other things, any system, device, or combination of those, by way of which access, whether direct or indirect, to cloud based storage can be achieved. As such, one or more clients may be in a cloud system, and/or one or more clients may be located at a customer site.

Figure 1:
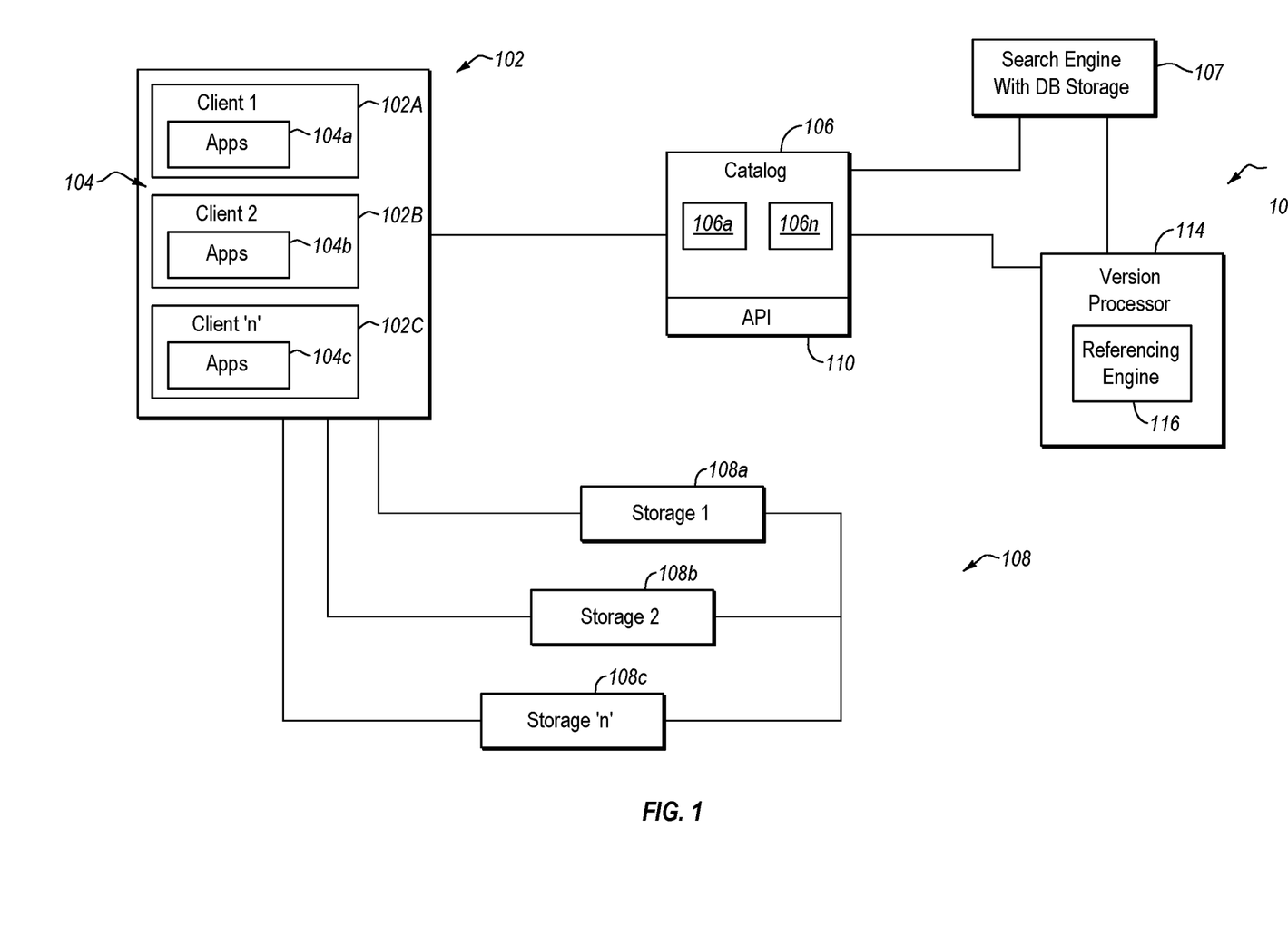
FIG. 1 is directed to aspects of a first example operating environment for at least some embodiments.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. In other embodiments, some, or all, of the elements of the operating environment 100 can reside on-premises at an enterprise. The operating environment 100 may include various devices including servers and other computers that are interconnected. The operating environment 100 may employ a variety of communication media, such as hardwire, optical, wireless, or some combination thereof. Unless otherwise indicated, communication between entities shown as connected can be unidirectional, or bidirectional.

As indicated in FIG. 1, the example operating environment 100 may include one or more clients 102, such as clients 102a, 102b, and 102c for example. Among other things, the clients 102 may host, or otherwise employ, one or more applications 104, such as application groups 104a, 104b, and 104c, respectively. The applications 104, which can be any type of application, may generate, and/or cause the generation of, data and associated metadata that is desired to be stored, such as in the form of a backup for example, and that can be used to restore data to the clients 102. The metadata generated by and/or at the direction of the clients 102 can be transmitted to a catalog 106 as part of a backup process, although other processes could be used to transmit such metadata from the clients 102 to a catalog 106, discussed below. The data with which the metadata is associated can be transmitted by the clients 102 to storage 108, discussed in more detail below. The metadata can include, but is not limited to, catalog entries associated with the data that is to be backed up.

One of the applications 104 on one or more of the clients 102 may be a backup client that can cooperate with a backup application on a backup server (not shown) to generate one or more backups of the client(s) 104 for storage and subsequent restoration. Examples of such backup servers include, but are not limited to, the EMC Avamar server, and the EMC NetWorker server.

With continued reference to FIG. 1, and as noted earlier herein, the example operating environment 100 includes a catalog 106 that includes metadata concerning stored data in the storage 108. In general, the functionality of the catalog 106 may be provided by an associated catalog service. The storage 108 can take any form and may be configured to receive and store data without requiring explicit synchronization. The storage 108 may consist of, or comprise, one or more non-relational databases or other non-relational data storage structures. Similarly, the catalog 106 may comprise, or consist of, one or more non-relational databases or other non-relational data storage structures.

The metadata stored in the catalog 106 can include any type or combination of metadata relating in any way to any type of stored data. In at least some embodiments, the catalog 106 includes metadata such as version information concerning a stored object or other data element. Such metadata can be received by the catalog 106 from one or more clients 102, and the catalog 106 can include respective metadata associated with each of several different backup targets.

The catalog 106 may be a centralized catalog that includes one or more application-specific catalogs 106a . . . 106n within it. Each of the application-specific catalogs may be associated with a particular type, or types, of data. The version metadata can be stored in the catalog 106 as a list, although that is not required. For example, the catalog 106 can include an index or list of the versions of an object, or objects, that are stored in storage 108, discussed below. The version listing may also include information concerning the physical storage location of the data associated with items in the version list.

The metadata in the catalog 106 may relate to a variety of different objects, each of which can be associated with a different respective application. Thus, the catalog 106 may, in some embodiments, be characterized as application-agnostic in that the catalog 106 is not limited to storing metadata associated with a single application but, instead, can include metadata generated by, and/or in connection with, a variety of different applications. Correspondingly, the metadata stored in catalog 106 can relate to any number of different storage locations in storage 108. In at least some embodiments, the catalog 106 only stores metadata, while the object(s) or other data elements with which that metadata are associated are stored separately from the metadata, such as in storage 108 discussed below. Some embodiments of the catalog 106 take the form of a cloud centralized catalog, although that is not required, and the catalog 106 need not be a cloud-based entity. Finally, the catalog 106 can include, or otherwise be associated with, a search engine 107, such as the 'Elastic Search' engine for example. Among other things, the search engine 107 can operate to perform searches of version information and other metadata stored at the catalog 106.

As further indicated in FIG. 1, and noted earlier, the operating environment 100 can include storage 108, such as storage 108a, 108b, and 108c, in which data generated by and/or at the direction of one or more of the clients 102 is stored. In general, the storage 108 stores the data to which the metadata contained in the catalog 106 relates.

The storage 108 can be any type, or type(s) of storage. Examples of storage 108 include, but are not limited to, network drives, appliances such as the EMC CloudBoost appliance, and cloud-based storage such as the Amazon Simple Storage Service (S3). As these examples illustrate, the storage 108 in a the example operating environment 100 can include one, or both, of on-premises storage such as network drives and appliances, and off-premises storage such as the S3 storage. Accordingly, the scope of the invention is not limited to any particular type or location of storage 108.

For security purposes and/or other reasons, the storage 108 in some embodiments is not accessible by the catalog 106 and, likewise, the catalog 106 is not accessible by the storage 108. While, in some embodiments at least, neither the catalog 106 nor the storage 108 is accessible by the other, the storage 108 and catalog 106 may nonetheless be visible to each other, that is, one of both of these entities may be aware of the presence or existence of the other. In other embodiments, neither the storage 108 nor the catalog 106 is visible to the other. In any case, arrangements of the catalog 106 and the storage 108 such as those just described help to maintain separation of data and its associated metadata, since the data is stored in the storage 108, while the metadata associated with the data in storage 108 is stored in the catalog 106. In order to facilitate interoperation and communication between the catalog 106 and storage 108, the catalog 106 can include one or more application program interfaces (API) 110.

The example operating environment 100 may further include a version processor 114. In general, and as discussed elsewhere herein, the version processor 114 can perform various processes with respect to data corresponding to catalog entries received by the catalog 106 from one or more of the clients 102. Example processes for establishing references between elements such as catalog entries can be performed in whole or in part by a referencing engine 116.

B. Example Host Configuration

Figure 2:
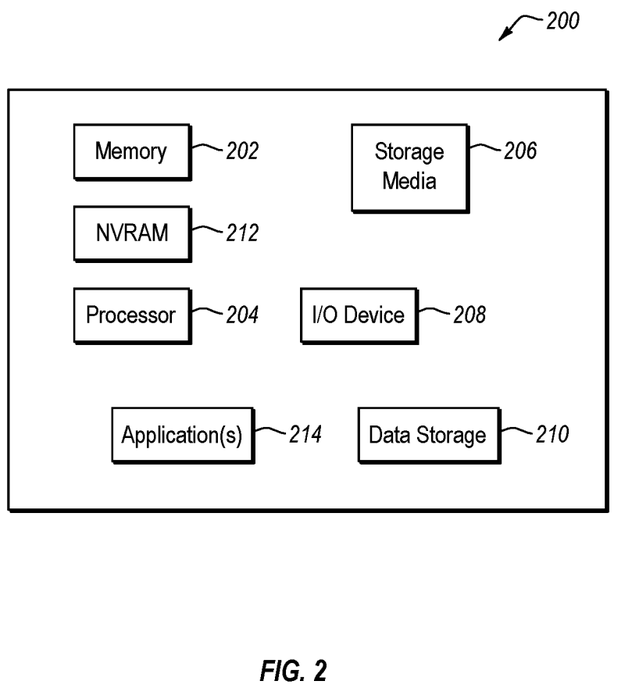
FIG. 2 is directed to an example computing device that may be employed in connection with some embodiments of the invention.

With reference briefly to FIG. 2, the catalog and/or version processor can be hosted on respective servers. In some instances, two or more of these may be hosted on a common server. In any case, such servers can consist of, comprise, or take the form of, one or more physical computing devices, one example of which is denoted at 200 in FIG. 2. In the example of FIG. 2, the computing device 200 includes a memory 202, one or more hardware processors 204, non-transitory storage media 206, I/O device 208, data storage 210, and NVRAM 212. As well, one or more applications 214 are provided that comprise executable instructions. Such executable instructions can take the form, for example, of any one or more of a catalog, a version processor, expiration computation engine, and a referencing engine. Additional, or alternative, applications can likewise be included in the applications 214.

C. General Aspects of Some Example Embodiments

With continued reference to the Figures, details are provided concerning aspects of some example embodiments. As suggested elsewhere herein, there may be a need to back up a variety of different objects. The objects themselves may be stored in storage such as storage 108, while metadata concerning the objects, including version information, may be stored in a catalog such as the catalog 106. More specifically, each version of an object may have a corresponding version record stored in the catalog. The stored versions can be quite different from each other. By way of illustration, a VM can have one version record that simply represents the state of the VM, while other version records associated with that VM represent different versions of one or more components or items of the VM.

As the foregoing VM example suggests, at least some version records are associated with each other in some way. Thus, eliminating a version record can have undesirable effects with regard to the other version record(s) with which the eliminated version record had/had an association. Using the VM example, the overall VM version record, or parent record, depends on one or more child or subordinate records, namely, the VM state version records and the VM component version records in this example. Because of this dependency, elimination of the child version records would in effect destroy the overall VM version record. Thus, the child records cannot be permitted to be deleted before the parent record. This is true even where there are a large number of child version records that are tracking numerous different aspects of the VM configuration.

In more detail, expiration of the child is prevented, or ignored, due to the implementation of a strong reference between the child and one or more objects, or other data elements, that are dependent upon the child. As used herein, a 'strong reference' refers to a reference whose nature is such that where a child and parent are connected by the strong reference, the child will not expire or be deleted before the parent expires or is deleted, notwithstanding that, for example, the child has a computed expiration data that precedes an expiration date of the dependent data element, that is, the parent.

In one example implementation, use of a strong reference between a parent and a child prevents removal of a child version entry from a version listing at a catalog before removal of the parent version entry from the version listing. Correspondingly, the data to which that child version entry corresponds may not be removed or deleted from storage before removal of the data to which the parent version entry corresponds.

In terms of implementation, a parent may declare its dependency on a particular child, or children, such that a strong reference is needed between that parent and its child/children. A strong reference between a parent and child can be defined by a client whose data is backed up, or will be, at a data storage environment, such as a cloud storage environment. Alternatively, the strong reference can be defined at the storage environment, such as by a catalog for example. In either case, the declaration by the parent can be made at, or about, the time that the child is created.

In some example embodiments of the invention, directed relationships are used to ensure that as between two or more elements, which can be stored or targeted to be stored, where a first one of the elements is dependent upon a second one of the elements, the independent second element is not removed from storage before the dependent first element is removed from storage. The elements sharing the dependent relationship can be data elements, such as objects for example, or can be metadata, such as catalog entries for example.

The dependent relationship can take a variety of forms. In one example, two catalog entries may be associated with respective data elements that have a parent-child relation with each other. The directed relationship in this example can provide that the child version will not be allowed to expire before the parent version expires, notwithstanding that a computed expiration date for the child may predate the expiration date of the parent. Thus, the child version will not be removed from storage so long as the parent version remains in storage. More particularly, the child version may be removed from storage at the same time as the parent version, or subsequent to removal of the parent version from storage.

In some cases, the computed expiration date for the child can be overridden and replaced with the expiration date of the parent so that both will expire at the same time. In any case, at least some embodiments provide that a parent and its children will only be allowed to expire together as a set, and will likewise be removed from storage at the same time.

The association of the strong reference with the parent and the child may take place, for example, at the catalog or at a version processor in communication with the catalog. The version processor may reside at the data storage environment. Once this association has been made between parent and child, the child cannot be deleted or removed before the parent and, accordingly, the child and parent will remain in storage and the catalog as a set, and be removed from the catalog and storage together as a set. In some embodiments, the association, once made, can be removed or changed, if desired. As noted elsewhere herein, the version processor may also compute expiration dates for versions that appear in the version listing. Where a strong reference exists between parent and child versions however, expiration of the child is suspended and the child will not expire before the version(s) that depend on it.

Regardless of the particular implementation, it should be noted that a number of variations are possible. For example, a parent may have a dependent relation with a single child, or with multiple children. As another example, a parent can be a child to another parent, and a child can be a parent to one or more other children.

Functionality such as that disclosed herein may be useful in a variety of different backup contexts. For example, such functionality can be employed in backup systems and processes where full backups are made only once, or infrequently, while differential, or incremental, backups occur more often. In such circumstances, there may be a chain of one or more full and/or incremental backups, one, some, or all, of which may have a parent or child relation to another full or incremental backup in the chain. Arrangements of these types may be referred to herein as a dependency chain.

As a result of such arrangements, the expiration and removal of one or more object or file versions, for example, from the dependency chain can destroy any other version or versions that depend on the removed object or file version. In some instances, such as where many versions are involved, such expiration can occur essentially randomly, thus creating uncertainty and instability in the stored versions. Thus, the use of strong references can help to preserve parent child relationships and, correspondingly, the functionality, stability and viability of those elements that have a dependent relationship regarding one or more other elements in the dependency chain. Strong references may be particularly useful in connection with non-relational databases, and other non-relational storage structures where, due to the lack of mechanisms and structures for associating stored objects or metadata, versions can expire without regard to any relationships that may exist between or among versions.

D. Aspects of Some Example Use Cases

Figure 3:
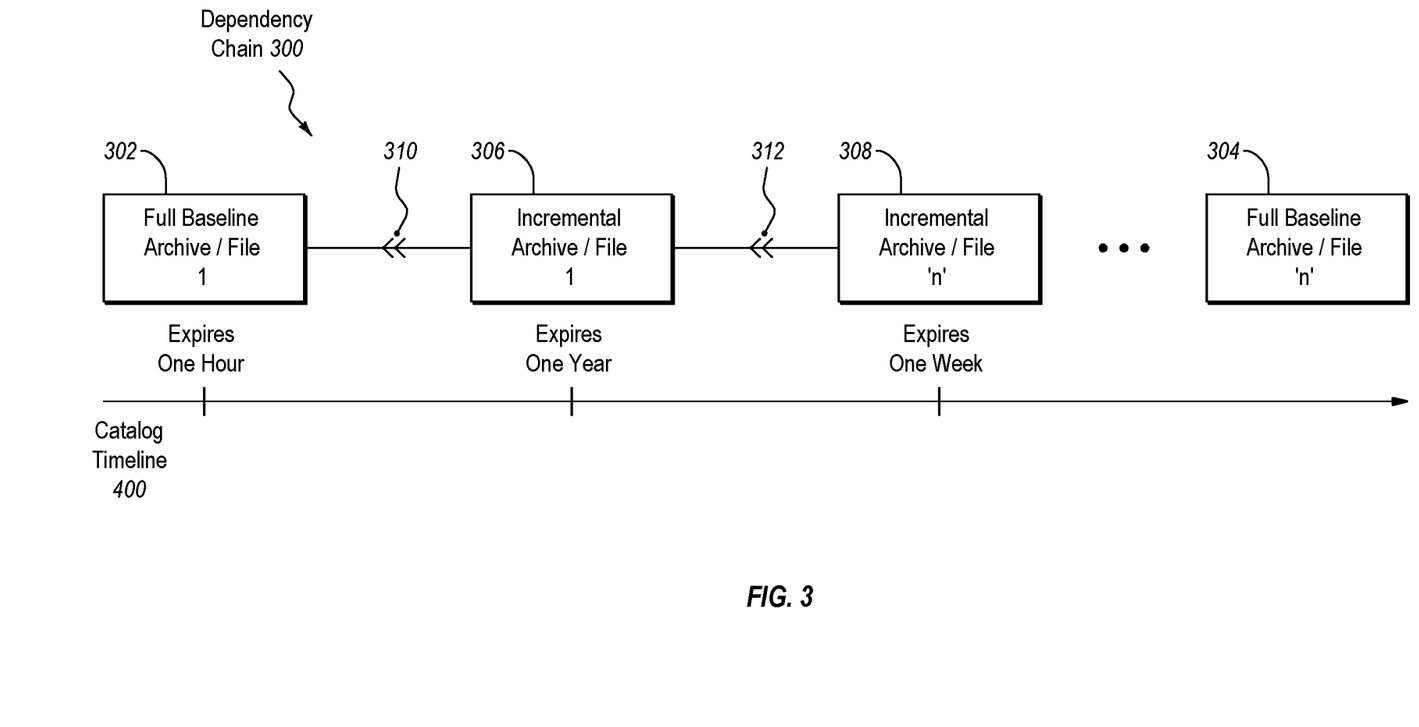
FIG. 3 is directed to a first example of a use case for one or more embodiments of the invention.
Figure 4:
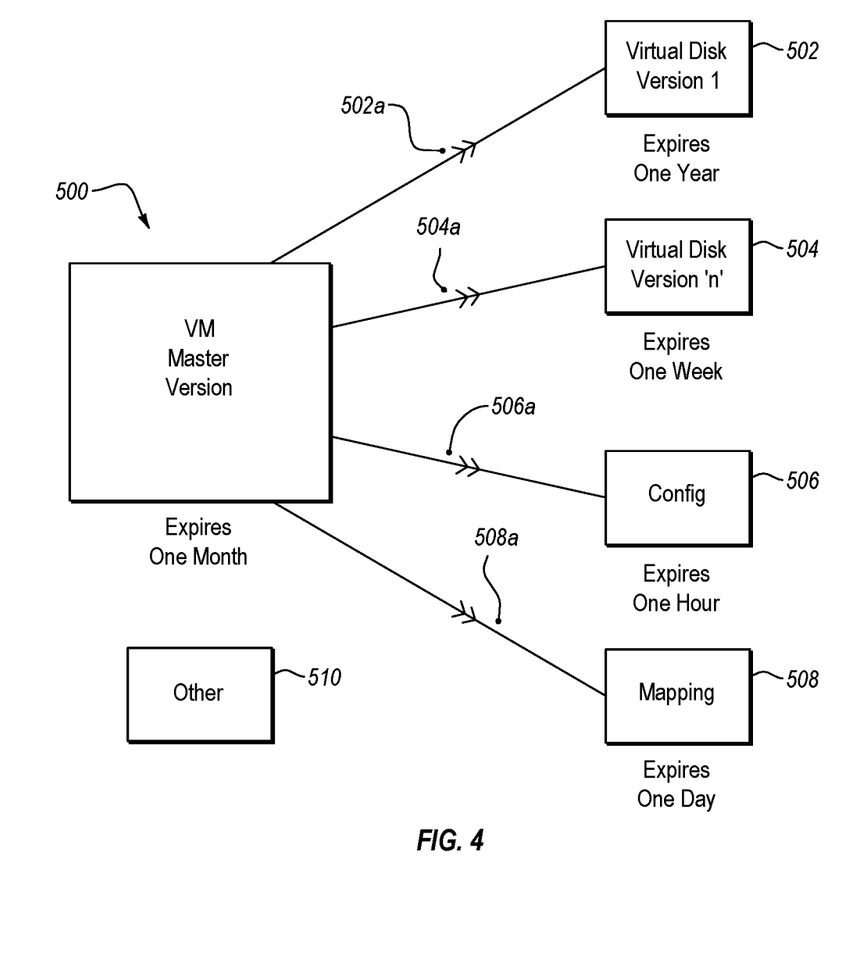
FIG. 4 is directed to a second example of a use case for one or more embodiments of the invention.

With attention now to FIGS. 3 and 4, details are provided concerning aspects of some example use cases for some embodiments of the invention. As indicated in the first example use case disclosed in FIG. 3, a dependency chain 300 can include one or more full baseline archives/files 302 and 304, as well as one or more incremental archives/files 306 and 308. The dependency chain 300 indicates the order, in time, that the various full and incremental backups are taken.

On the other hand, a catalog timeline 400 indicates the relative expiration times of the more full baseline archives/files 302 and 304, and incremental archives/files 306 and 308. From the perspective of the catalog, all of the full and incremental backups are simply different versions of the same file.

In the illustrated example, the full baseline archive/file 304 may expire one hour after a particular point in time T. Relative to that same point in time T, the incremental archive/file 306 may expire one year after time T, and the incremental archive/file 308 may expire one week after time T. These expiration times/dates can be computed and assigned by a version processor, for example. However, the incremental archive/file 306 may be the most important version in this example, as it cannot exist without the full baseline archives/files 302. The different expiration times may reflect, for example, that the various incremental and full backups have been created at different respective times.

Accordingly, and as further indicated in FIG. 3, various strong references can be defined and implemented. For example, a strong reference 310 can be inserted or associated between the full baseline archive/file 302 and the incremental archive/file 306. As well, a strong reference 312 can be inserted or associated between the incremental archive/file 306 and the incremental archive/file 308.

The use of the strong reference 310 reflects the fact that the full baseline archive/file 302 has been modified as reflected in the incremental archive/file 306. Because the latter is only incremental however, rather than being a full backup, the incremental archive/file 306 lacks significance in the absence of the full baseline archive/file 302. That is, the incremental archive/file 306 presents only an incomplete picture of the data if the full baseline archive/file 302 is not present.

Similarly, use of the strong reference 312 reflects the fact that the incremental archive/file 306 has been modified as reflected by the incremental archive/file 308. Because the latter is incremental, relative to the incremental archive/file 306, the incremental archive/file 308 lacks significance in the absence of either, or both, of the full baseline archive/file 302 and the incremental archive/file 306. Thus, in order that an accurate picture exists of the state of the stored data, the simultaneous existence in the catalog and/or storage, as applicable, of the incremental archive/file 308, the full baseline archive/file 302, and the incremental archive/file 306 must be maintained.

This is achieved through the use of the strong references 310 and 312 which ensure that, notwithstanding that the full baseline archive/file 302 is set to expire before the incremental archive/file 306, expiration of the full baseline archive/file 302 will be suspended until the incremental archive/file 306 expires. In this particular example, the strong reference 310 is provided between a full backup and an incremental backup. As further indicated in FIG. 3, strong references can also be provided between two incremental backups. Particularly, the strong reference 312 is provided between the incremental archive/file 306 and the incremental archive/file 308.

With continued reference to FIG. 3, it can be seen that the full baseline archive/file 304 lacks any dependency on the preceding incremental or full backups. For example, the full baseline archive/file 304 can be taken without the use of the preceding incremental or full backups, and if the full baseline archive/file 304 should be deleted for some reason, there is no impact to those preceding incremental and full backups. Thus, there is no need, in this example, for a strong reference between the full baseline archive/file 304 and the incremental archive/file 308. That is, a strong reference between versions may be omitted in circumstances where no dependent relation exists between those versions.

With attention now to FIG. 4, details are provided concerning aspects of another example use case for some embodiments of the invention. In the example of FIG. 4, a master version 500 of a virtual machine has been backed up. The master version 500 may be stored in storage, and may have a corresponding version entry in a catalog version listing. In this example, the master version 500 of the VM is a composite of its children, namely, virtual disk version 1 502, virtual disk version 'n' 504, configuration file 506, and mapping information 508. The master version 500 of the VM can include other components 510 that may, or may not, have a strong reference to the master version 500.

Because the master version 500 is a composite of the children 502 . . . 508, the children 502 . . . 508 cannot be allowed to expire before the master version 500 expires. Thus, strong references 502a, 504a, 506a and 508a are implemented that will prevent this result. Absent these strong references, the assigned expiration times would allow, for example, the virtual disk version 'n' 504, the configuration file 506, and the mapping 508 to expire before the master version 500 expired.

E. Aspects of Some Example Processes

Figure 5:
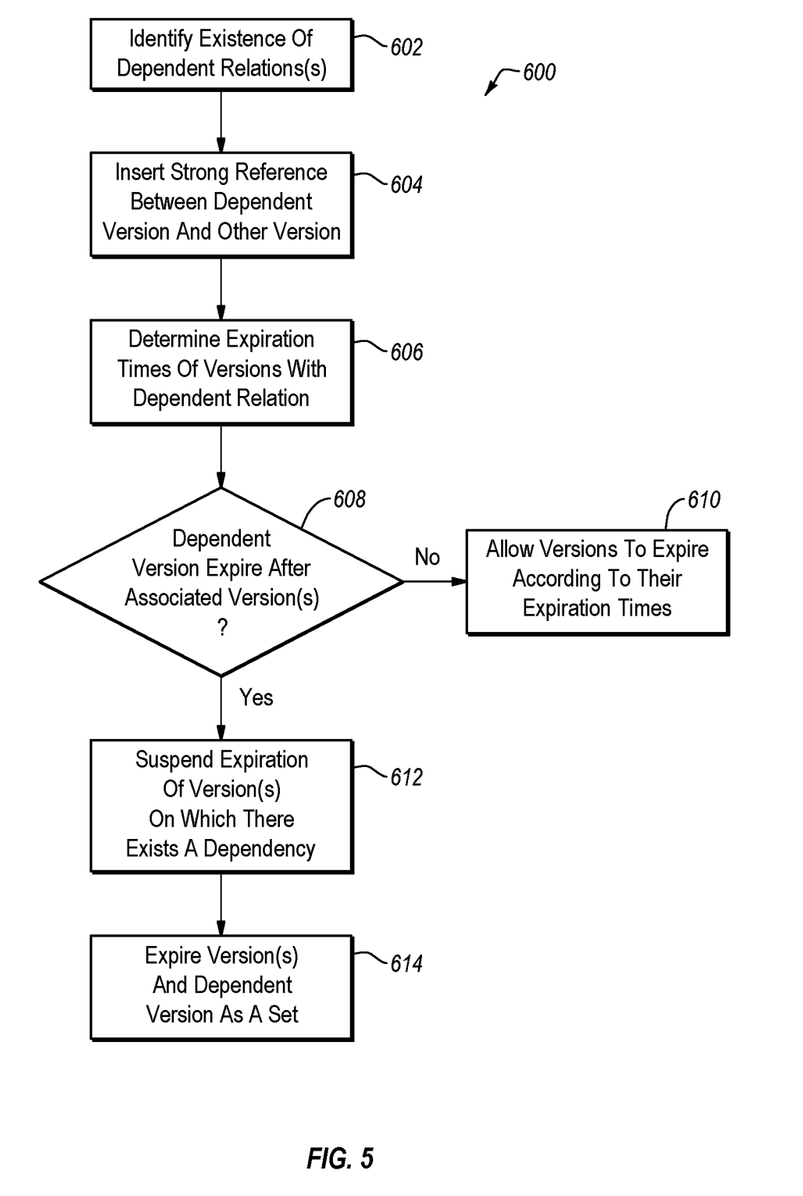
FIG. 5 is a flow diagram disclosing aspects of an example embodiment of a method.

With attention now to FIG. 5, details are provided concerning aspects of some example methods, one particular example of which is denoted generally at 600. Part, or all, of the method 600 can be performed by an entity of a data storage environment, such as a catalog for example. In some cases, an entity such as the catalog may perform the method 600 with respect to metadata, such as data element versions appearing in a version list of the catalog. Operations on the data to which the metadata correspond, can be performed by, or at the direction of, a storage entity. The operation of the catalog with respect to the metadata, and the operation of the storage with respect to the corresponding data, can be coordinated in some cases by a service that communicates with the catalog and the storage.

The method 600 can begin when the existence of a dependent relationship, such as between versions of a data element, is identified 602. An example of such a relationship can be the relation between a full backup and an associated incremental backup. See, e.g., FIG. 3. Another example of such a relationship can be the relation between an entity and one or more of the constituent components of that entity. See, e.g., FIG. 4.

When a dependent relationship is determined to exist, a strong reference is inserted 604 between the dependent version, and the version(s) upon which the dependent version depends. The strong reference can be inserted by a referencing engine (see, e.g., reference 116 of FIG. 1), for example, of a version processor. Prior to, at about the same time, or after, insertion of the strong reference 604, the respective expiration times of the dependent version, and the version(s) upon which the dependent version depends are determined 606. These expiration times can be computed, for example, by an entity such as a version processor that may be associated with a catalog of a data storage environment.

After the expiration times have been determined 606 for the version(s) sharing the identified dependent relation, a determination can then be made as to whether or not a dependent version will expire after a version, or versions, upon which the dependent version depends. In particular, the expiration time of the dependent version can be compared 608 with the respective expiration times of the associated version(s) upon which it depends. If the dependent version is the last to expire, or expires at the same time as the last associated version expires, then the dependent version and the associated versions on which it depends will all be allowed to expire 610 at their computed expiration times.

On the other hand, if the comparison 608 of the expiration time of the dependent version with the respective expiration times of the associated version(s) upon which it depends reveals that the dependent version is set to expire after one or more of those associated versions, then expiration of any such versions is suspended 612. This suspension 612 can be maintained until the dependent version is set to expire, at which time the dependent version and all of its associated versions can be allowed to expire as a set 614.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, and engines described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   declaring, by a version record of a virtual machine (VM), a dependent relation between the version record of the VM and a version record of a component of the VM, wherein the version record of the VM is different from, and dependent upon, the version record of the component of the VM;
   based upon the declaring, inserting a strong reference between the version record of the VM and the version record of the component of the VM;
   determining respective expiration times for each of the version record of the VM and the version record of the component of the VM; and
   when the version record of the component of the VM has an expiration time prior to an expiration time of the version record of the VM, preventing the version record of the component of the VM from being deleted from a catalog before the version record of the VM is deleted from the catalog.

2. The method as recited in claim 1, wherein the VM is a part of a full backup of data, and the component of the VM is part of an incremental backup of the data.

3. The method as recited in claim 1, wherein the VM and the component of the VM are stored in storage, and the component of the VM is prevented from being deleted from the storage before the first version VM is deleted from the storage.

4. The method as recited in claim 1, wherein the catalog comprises a non-relational database.

5. The method as recited in claim 1, wherein at the expiration of the version record of the component of the VM, the version record of the component of the VM and the version record of the VM are allowed to expire together as a set.

6. The method as recited in claim 5, wherein expiration of the set occurs at the expiration time of the version record of the VM.

7. The method as recited in claim 1, wherein the method further comprises the version record of the VM declaring another dependent relation between the version record of the VM and respective version records of one or more additional components of the VM, and the another dependent relation is such that the version record of the VM is dependent upon the respective version records of the one or more additional components.

8. A non-transitory storage medium having stored therein instructions which are executable by one or more hardware processors to perform operations comprising:
  declaring, by a version record of a virtual machine (VM), a dependent relation between the version record of the VM and a version record of a component of the VM, wherein the version record of the VM is different from, and dependent upon, the version record of the component of the VM;
  based upon the declaring, inserting a strong reference between the version record of the VM and the version record of the component of the VM;
  determining respective expiration times for each of the first version record of the VM and the version record of the component of the VM; and
  when the version record of the component of the VM has an expiration time prior to an expiration time of the version record of the VM, preventing the version record of the component of the VM from being deleted from a catalog before the version record of the VM is deleted from the catalog.

9. The non-transitory storage medium as recited in claim 8, wherein the VM is a part of a full backup of data, and the component of the VM is part of an incremental backup of the data.

10. The non-transitory storage medium as recited in claim 8, wherein the VM and the component of the VM are stored in storage, and the component of the VM is prevented from being deleted from the storage before the VM is deleted from the storage.

11. The non-transitory storage medium as recited in claim 8, wherein the catalog comprises a non-relational database.

12. The non-transitory storage medium as recited in claim 8, wherein after suspension of the expiration of the version record of the component of the VM, the version record of the component of the VM and the version record of the VM are allowed to expire together as a set.

13. The non-transitory storage medium as recited in claim 8, wherein the method further comprises the version record of the VM declaring another dependent relation between the version record of the VM and respective version records of one or more additional components of the VM, and the another dependent relation is such that the version record of the VM is dependent upon the respective version records of the one or more additional components.

14. A system, comprising:
  one or more hardware processors; and
  a non-transitory storage medium having stored therein instructions which are executable by the one or more hardware processors to perform operations comprising:
    declaring, by a version record of a virtual machine (VM), a dependent relation between the version record of the VM and a version record of a component of the VM, wherein the version record of the VM is different from, and dependent upon, the version record of the component of the VM;
    based upon the declaring, inserting a strong reference between the version record of the VM and the version record of the component of the VM;
    determining respective expiration times for each of the version record of the VM and the version record of the component of the VM; and
    when the version record of the component of the VM has an expiration time prior to an expiration time of the version record of the VM, preventing the version record of the component of the VM from being deleted from a catalog before the version record of the VM is deleted from the catalog.

15. The system as recited in claim 14, wherein the VM and the component of the VM are stored in storage, and the component of the VM is prevented from being deleted from the storage before the VM is deleted from the storage.

16. The system as recited in claim 14, wherein the VM is a part of a full backup of data, and the component of the VM is part of an incremental backup of the data.

17. The system as recited in claim 14, wherein the catalog comprises a non-relational database.

18. The system as recited in claim 14, wherein after suspension of the expiration of the version record of the component of the VM, the version record of the component of the VM and the version record of the VM are allowed to expire together as a set.

19. The system as recited in claim 14, wherein the operations further comprise the version record of the VM declaring another dependent relation between the version record of the VM and respective version records of one or more additional components of the VM, and the another dependent relation is such that the version record of the VM is dependent upon the respective version records of the one or more additional components.

20. The system as recited in claim 14, wherein the version record of the VM has a dependent relation with a VM state version record.

* * * * *